(12) United States Patent
Shu et al.

(10) Patent No.: US 6,978,074 B2
(45) Date of Patent: Dec. 20, 2005

(54) FIBER OPTIC SENSORS FOR GAS TURBINE CONTROL

(75) Inventors: Emily Yixie Shu, Niskayuna, NY (US); Louis Jacob Petrucco, Albany, NY (US); Wolfgang Daum, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 215 days.

(21) Appl. No.: 10/446,758

(22) Filed: May 28, 2003

(65) Prior Publication Data

US 2005/0180699 A1    Aug. 18, 2005

Related U.S. Application Data

(62) Division of application No. 09/328,354, filed on Jun. 9, 1999, now Pat. No. 6,599,028, which is a division of application No. 08/877,341, filed on Jun. 17, 1997, now Pat. No. 5,978,525.

(51) Int. Cl.[7] .............................. G02B 6/00; G02B 6/04
(52) U.S. Cl. ...................................... 385/137; 385/115
(58) Field of Search ........................ 385/76–89, 12–13, 385/115, 123, 138–139, 136–137

(56) References Cited

U.S. PATENT DOCUMENTS

| | | |
|---|---|---|
| 3,752,090 A | 8/1973 | Frankel et al. |
| 4,710,216 A * | 12/1987 | Harada et al. ................ 65/411 |
| 4,772,093 A * | 9/1988 | Abele et al. ................ 385/119 |
| 5,148,667 A | 9/1992 | Morey |
| 5,166,990 A | 11/1992 | Riccitelli et al. |
| 5,408,830 A | 4/1995 | Lovett |
| 5,471,840 A | 12/1995 | Lovett |
| 5,676,712 A | 10/1997 | Anderson |
| 5,682,453 A * | 10/1997 | Daniel et al. ................ 385/99 |
| 5,721,802 A * | 2/1998 | Francis et al. ............. 385/137 |

FOREIGN PATENT DOCUMENTS

| | | |
|---|---|---|
| DE | 3437103 A | 10/1984 |
| DE | 29611439 U | 7/1996 |
| EP | 638770 A1 | 8/1994 |

* cited by examiner

*Primary Examiner*—Frank G. Font
*Assistant Examiner*—Michael P. Mooney
(74) *Attorney, Agent, or Firm*—Ann M. Agosti; Patrick K. Patnode (57) ABSTRACT

An apparatus for detecting flashback occurrences in a premixed combustor system having at least one fuel nozzle includes at least one photodetector and at least one fiber optic element coupled between the at least one photodetector and a test region of the combustor system wherein a respective flame of the fuel nozzle is not present under normal operating conditions. A signal processor monitors a signal of the photodetector. The fiber optic element can include at least one optical fiber positioned within a protective tube. The fiber optic element can include two fiber optic elements coupled to the test region. The optical fiber and the protective tube can have lengths sufficient to situate the photodetector outside of an engine compartment. A plurality of fuel nozzles and a plurality of fiber optic elements can be used with the fiber optic elements being coupled to respective fuel nozzles and either to the photodetector or, wherein a plurality of photodetectors are used, to respective ones of the plurality of photodetectors. The signal processor can include a digital signal processor.

11 Claims, 7 Drawing Sheets

FIBER OPTIC SENSORS FOR GAS TURBINE CONTROL

This application is a division of application Ser. No. 09/328,354, filed Jun. 9, 1999, now U.S. Pat. No. 6,599,028 which is a divisional of application Ser. No. 08/877,341 filed Jun. 17, 1997, now U.S. Pat. No. 5,978,525, which is hereby incorporated by reference in its entirety.

This invention was made with US Government support under contract number NAS327235 awarded by NASA. The Government has certain rights in the invention.

BACKGROUND OF THE INVENTION

Gas turbines generally include a compressor, one or more combustors, a fuel injection system and a turbine. Typically, the compressor pressurizes inlet air which is then reverse-flowed to the combustors where it is used to provide air for the combustion process and also to cool the combustors. In a multi-combustor system, the combustors are located about the periphery of the gas turbine, and a transition duct connects the outlet end of each combustor with the inlet end of the turbine to deliver the hot products of combustion to the turbine.

Gas turbine combustors are being developed which employ lean premixed combustion to reduce emissions of gases such as $NO_x$ (nitrogen oxides). One such combustor comprises a plurality of burners attached to a single combustion chamber.

Each burner includes a flow tube with a centrally disposed fuel nozzle comprising a center hub which supports fuel injectors and swirl vanes. During operation, fuel is injected through the fuel injectors and mixes with the swirling air in the flow tube, and a flame is produced at the exit of the burner. The combustion flame is stabilized by a combination of bluffbody recirculation behind the center hub and swirl-induced recirculation. Because of the lean stoichiometry, lean premixed combustion achieves lower flame temperature and thus produces lower $NO_x$ emissions.

These premixed systems are susceptible to an unpredictable phenomena commonly referred to as "flashback." Flashbacks can be caused by any of a number of events, including ignition of impurities in fuel or ignition during mode switching when the flames are in a transient phase. When flashback occurs, a flame enters zones or cavities of the combustor chamber which may not be designed to contain flames. A flame can also move unexpectedly into combustor cavities used for firing modes other than the combustion mode being exercised at the time of the flashback occurrence. Both types of flashback occurrences result in a loss of combustion control and can additionally cause heating and melting of combustor parts, such as fuel nozzles, for example, that are not designed to withstand excessive heating. An operator generally has no method of recognizing the occurrence of a flashback until the combustor sustains damage.

Flashback is accompanied by a step change in emitted visible light from the flame in an area of the combustor where the flame should not exist. Some factors which can contribute to variability in the light profile include: fuel nozzle dimensions, combustion modes, location of sensor with respect to flame, and sensor integrity (aging effects, temperature effects, and fiber fouling).

Fiber optic sensors for combustion and industrial process monitoring and diagnosis in gas turbine and aircraft engine applications require rugged equipment and a high signal level. Generally such fiber optic sensors include large diameter sapphire or quartz rods or bundles of multiple fibers. These designs can be bulky, rigid, and expensive because of special components needed for coupling and packaging. For example, either a very long fiber bundle or a connector with special lenses is required to couple a fiber bundle sensing head to a remote electronic device, and these elements are lossy, bulky, and expensive. Similar coupling problems exist for sensors involving large diameter sapphire or quartz rods. Additionally, rods are too rigid to withstand mechanical and thermal stress for large mechanical systems which frequently undergo high temperature thermal cycles. During machining thermal cycles, dynamic vibrations, installation, and maintenance handling, large rods can crack.

Multiple optical fiber bundles are useful in some applications to provide a large light collecting area as well as redundancy in the event of fiber damage. Many packaging techniques, however, cannot withstand temperatures in excess of about 250° C. Commercially available adhesives such as high temperature ultra-violet cured optical epoxies can withstand temperatures up to about 175° C. Quartz tubing fused fiber bundles require heating the bundle to a temperature greater than 1500° C. in order to melt the quartz. Silica fibers generally include germanium or fluorine dopants to provide desired numerical apertures. At above 700° C., and particularly at above 900° C., dopants in silica fiber cladding start to diffuse into the blank fused silica fiber core and the fibers then lose their original numerical apertures. Therefore, 700° C. is often used as the damage threshold for long term heating of silica fibers.

Detection circuitry must detect flashbacks and prevent false indications of flashbacks. A simple static comparator circuit (such as a limit switch) may have a limited lifetime as compared with the combustor and may require individual tuning of sensors and/or their data to cancel the effects of systematic variations on DC levels and AC levels such as mounting location, diode efficiency, and fiber optic cable/connector efficiency, for example.

SUMMARY OF THE INVENTION

It would be desirable to have a means of quickly detecting the occurrence of a flashback so that a combustor control could react to prevent damage by altering or turning off the combustion; to have an economical sensor that is flexible to bending, light weight, resistant to vibrations, and easy to mount and remove; to have a fiber optic device that can withstand high temperatures and pressures; and to have a method for bundling fibers for high temperature sensing applications.

In one embodiment of the present invention, multiple optical fibers and at least one photodetector are used to sense flashback.

In another embodiment of the present invention an optical sensor includes a single optical fiber conduit system in a sensing head and light guide.

In another embodiment of the present invention, an optical fiber device has a bullet tip shape which enables simple fabrication of a sensor head and reduces the escape of hot gases from seal failure.

In another embodiment of the present invention, a plurality of optical fibers are packed in a support ring, the spaces between the optical fibers are filled with a glass paste which is heated to a melting temperature until the glass paste fuses and bonds to the bundle ends, and the temperature of the glass paste is slowly reduced.

In the above embodiments of the present invention, a microprocessor can be used to reduce the consequences of systematic and time variant effects and to reduce the costs of installation and testing.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF PREFERRED EMBODIMENTS OF THE INVENTION

Figure 1:
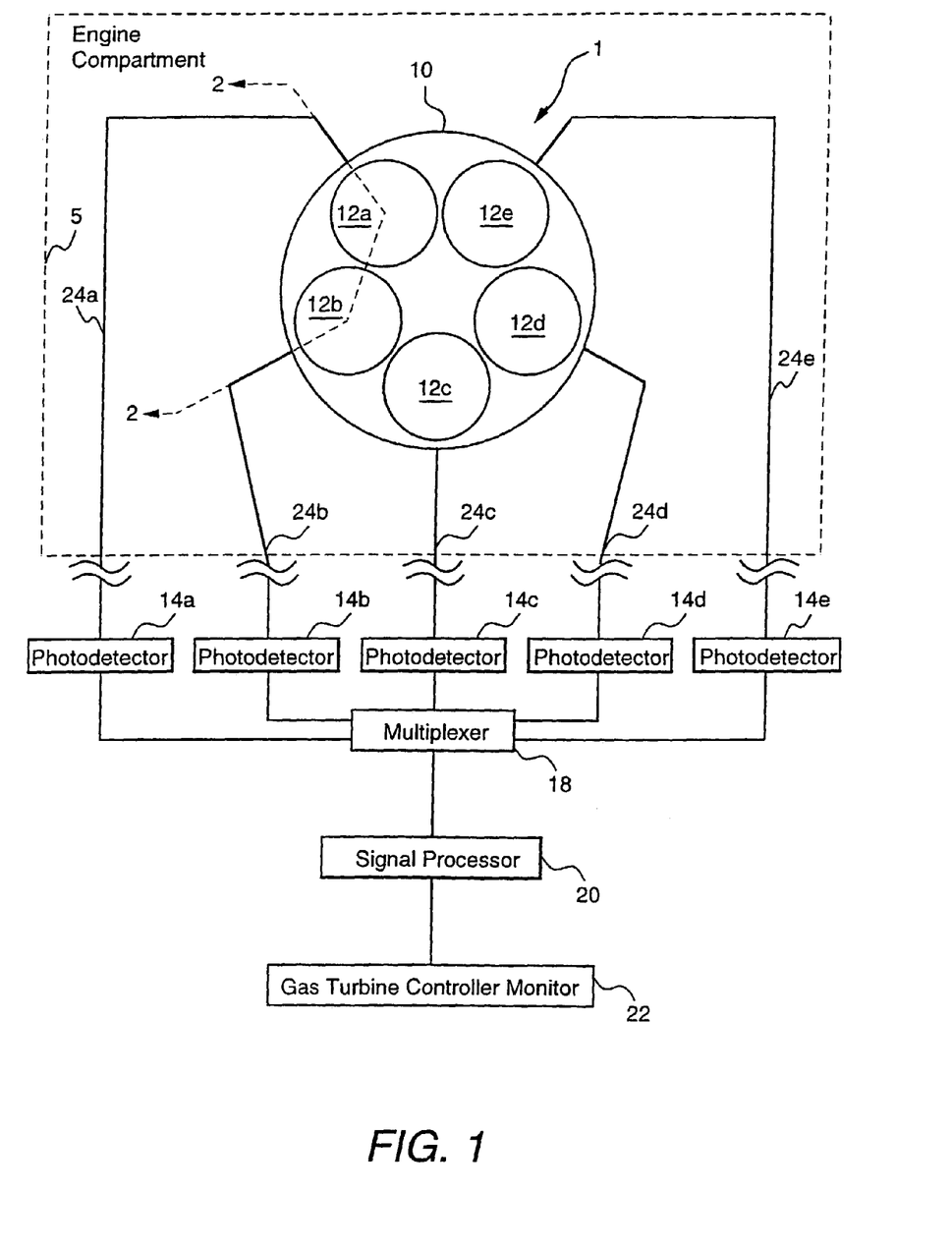
FIG. 1 is a block diagram of a flashback protection embodiment of the present invention.
Figure 2:
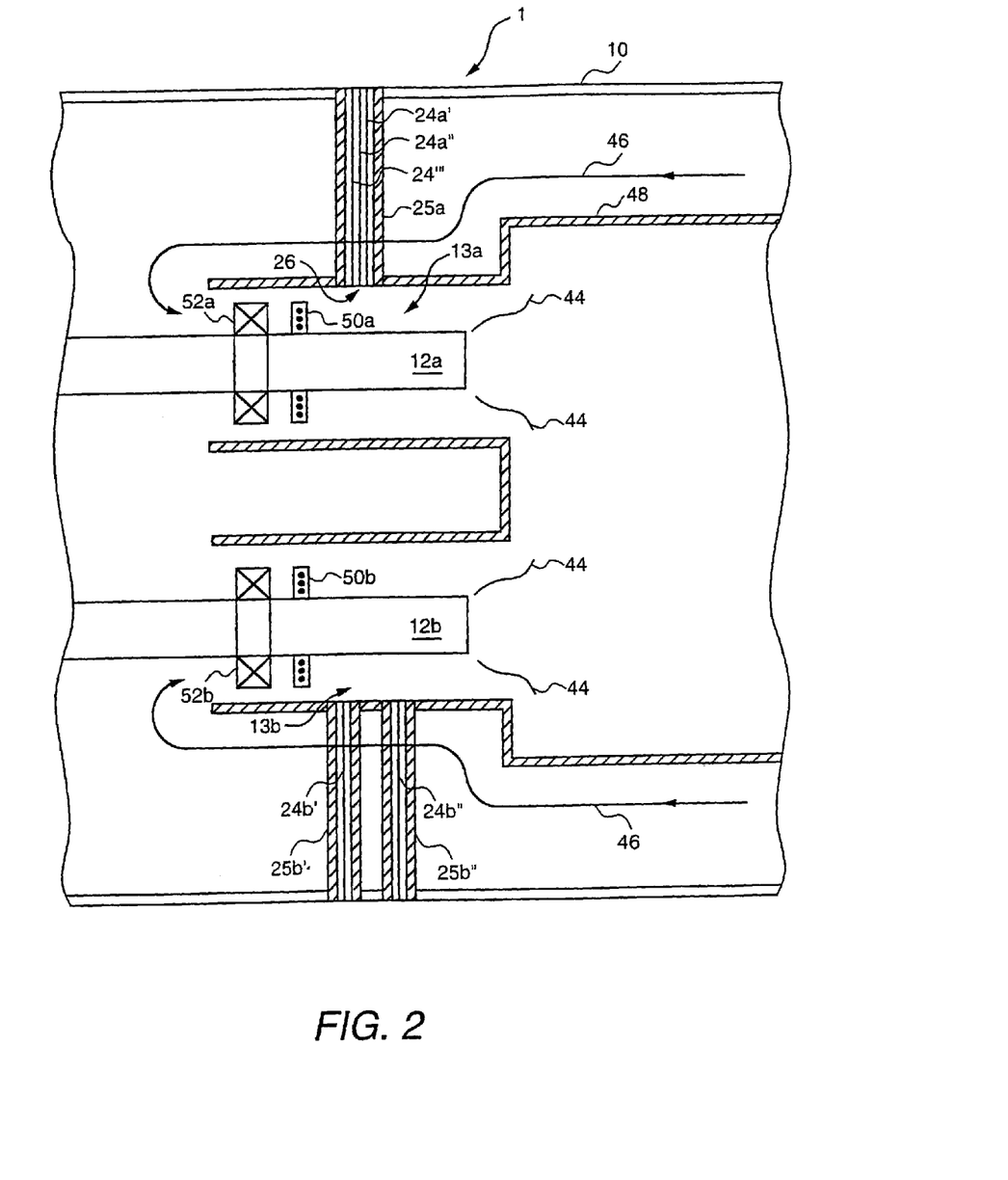
FIG. 2 is a sectional view of a portion of the embodiment of FIG. 1.

FIG. 1 is a block diagram of a flashback protection embodiment of the present invention, and FIG. 2 is a sectional view of a portion of the embodiment of FIG. 1.

A combustor 1 includes at least one fuel nozzle (and preferably a plurality of fuel nozzles 12a, 12b, 12c, 12d, and 12e) capable of supplying flames 44. Each of the fuel nozzles is monitored using a fiber optic element 24a, 24b, 24c, 24d, or 24e comprising at least one respective optical fiber which sends an optical signal to a respective photodetector 14a, 14b, 14c, 14d, or 14e.

If desired, each optical fiber optic element 24a, 24b, 24c, 24d, or 24e may comprise several optical fibers in a bundle as shown by optical fibers 24a', 24a", and 24a'" in FIG. 2.

In one embodiment each fiber optic element includes at least one optical multi-mode fiber pressure-sealed at one end 26 or both ends into a protective tube (shown as tube 25a in FIG. 2) which is capable of withstanding the operating environment. In one embodiment the optical fiber comprises quartz and tube 25a comprises stainless steel. An optical microlens can be used, if desired, for selectively collecting light from the flame which exists during flashback from a portion of the protective tube. The tube can be inserted through holes in a combustor casing 10 (in the air path 46) and a combustor liner 48. The tube can be attached to the combustor casing using a compression fit connection (not shown).

On the other end of the tube, a photodetector can be mounted. In one embodiment, the photodetector comprises a semiconductor photodiode of a material such as silicon, gallium arsenide, silicon carbide, germanium, gallium nitride or gallium phosphide. The photodetectors can be situated outside of an engine compartment 5 which holds the combustor and therefore be protected from the harsh combustion environment. Each photodetector can send an electrical signal to a multiplexer 18 which can then transmit the data to a signal processor 20 before being acted on by a gas turbine controller/monitor 22 (shown in FIG. 1).

In one embodiment, each fiber optic element 24a, 24b, 24c, 24d, or 24e comprises a respective single fiber sensing and conduit system which is useful for achieving mechanical flexibility for tight space packaging. A fine single fiber having a diameter from about 100 micrometers to about 200 micrometers is very flexible and light weight and thus can bend with little damage or light loss and can fit into crowded spaces. Light weight and flexibility reduce the damage impact from any mechanical stress on the assembly. A single fiber system enables the use of commercial fiber optic components including fibers, couplers, connectors, cables, and tools, for example, for applications such as multiplexing, splicing, terminating connectors, fiber polishing, and instrument measuring. The telecommunications industry has infrastructures for its fiber optic products that can be applied and modified as needed for sensing applications.

For combustor sensing in a high temperature environment, an optical fiber must have high endurance in the applicable temperature range. Although rods can generally withstand high temperatures, special mating components are needed to couple light from a rod to a conduit in the vicinity of a high temperature combustor. Many multi-fiber bundles are limited by temperature constraints, and those that can withstand high temperatures are generally expensive.

Individual high temperature resistant fibers are more flexible and can be fabricated at a lower cost than bundles and rods. For example, metal coated silica fibers are commercially available and can withstand temperatures as high as about 700° C. These fibers can serve as sensing heads and are easily attachable to a regular fiber cable by a standard fiber optic connector. A single fiber sensor head can be packaged and supported at a tip, as described below with respect to FIG. 5.

Figure 4:
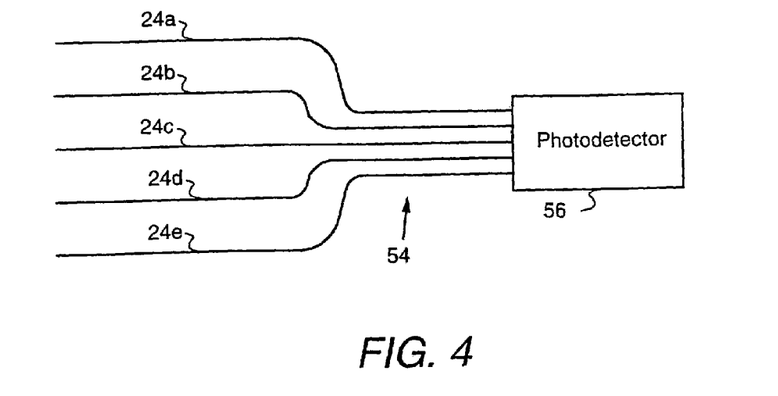
FIG. 4 is a partial block diagram of another embodiment of the present invention.

Although one fiber optic element and one photodetector per fuel nozzle are shown, any of a number of configurations is possible. For example, as shown in FIG. 4, one fiber optic element 24a, 24b, 24c, 24d, or 24e can be used for each nozzle with all the fiber optic elements either arranged together in a bundle 54 and served by one photodetector 56 or optically coupled to a single fiber (not shown) and served by one photodetector. Whenever multiple photodetectors are used, a simple scanning or multiplexing system (shown as multiplexer 18 in FIG. 1) can be used as an interface between the multiple sensing system and the signal processor.

As shown in FIG. 2, in a preferred embodiment the fiber optic element is pointed or aimed at regions (hereinafter referred to as test regions) 13a or 13b of the fuel nozzles wherein flames are not present under normal operating conditions. One such test region is at the back portion of the fuel nozzle 12a or 12b just forward (downstream) from swirl vanes 52a or 52b and a fuel injector 50a or 50b. At this location, the fuel nozzle is not sufficiently hot to emit significant amounts of infrared radiation (IR) that otherwise would saturate a broad spectral responsive semiconductor photodiode with small bandgaps (e.g. silicon, germanium, or gallium arsenide). This simplifies the detection scheme because no IR filters are required.

If desired, for redundancy purposes, a plurality of fiber optic elements 24b' and 24b" in respective tubes 25b' and 25b" can be used to monitor flashback in a fuel nozzle.

Figure 3:
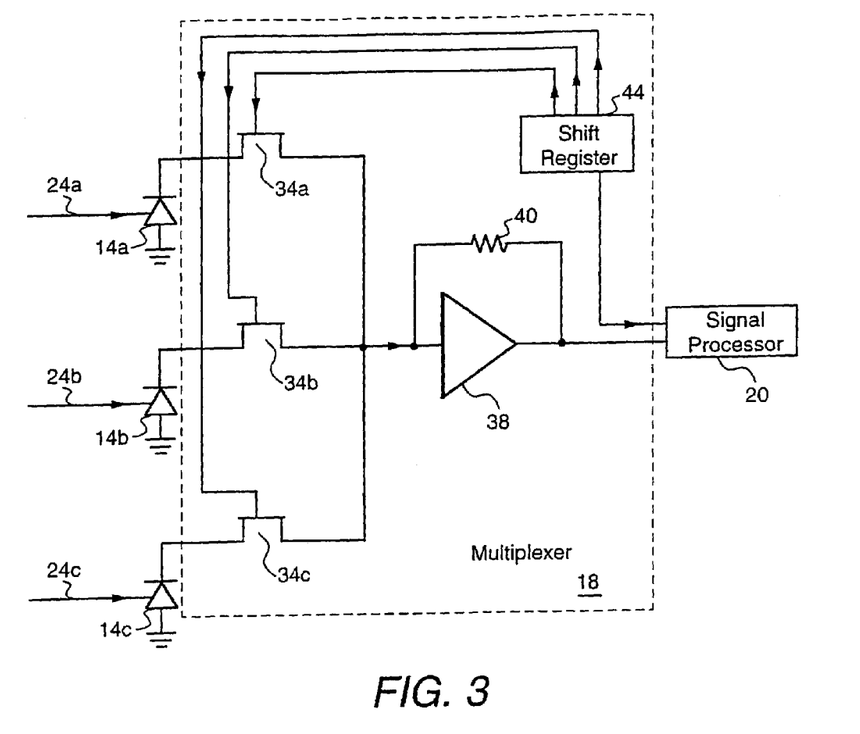
FIG. 3 is a circuit diagram of a flashback protection embodiment of the present invention.

FIG. 3 is a circuit diagram of an example flashback protection embodiment of the present invention. Fiber optic elements 24a, 24b, and 24c transmit any detected light to respective photodetectors 14a, 14b, and 14c which transmit any resulting electrical signals to multiplexer 18 which includes switches shown as field effect transistors 34a, 34b, and 34c, for example. A shift register 44 can control the timing of switch operation, and an amplifier 38/resistor 40 pair can be used for signal amplification before signal transmission from the multiplexer to signal processor 20. The diagram of FIG. 3 is for purposes of example only. In another embodiment, for example, an analog-to-digital converter can be used with the switching and amplification then occurring digitally.

If light is detected by a photodetector at a level to indicate that a flame is present in a test region wherein it should not be, the information is transmitted from the signal processor 20 to the controller/monitor 22 (shown in FIG. 1) which can then turn off combustor 1 and/or provide instructions for preventing damage.

Figure 5:
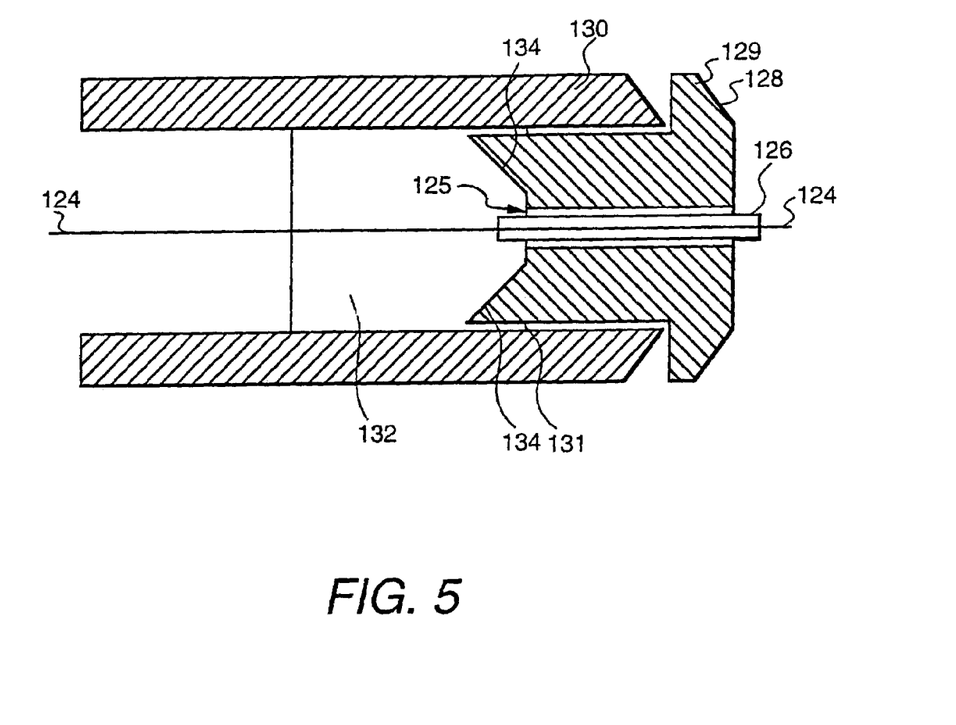
FIG. 5 is a sectional side view of an optical fiber device.

FIG. 5 is a sectional side view of an optical fiber device. In a combustion environment, an optical fiber sensor should be hermetically sealed to withstand the high temperatures and high gas pressures.

In the present invention an optical fiber device includes a cylindrically shaped bullet tip 128 having a hole 125 extending axially therethrough and front and back bullet tip ends 129 and 131 preferably with a larger diameter at the front bullet tip end than at the back bullet tip end. A section of tubing 130 surrounds the back bullet tip end. The bullet tip and tubing can be welded together using a silver brazing or hard soldering process.

After welding, any debris is removed by machining, polishing, and solvent cleaning. The bullet tip and tubing may comprise materials that can withstand high temperatures and pressures such as stainless steel and molybdenum, for example.

In one embodiment, the tubing comprises a layered material which provides proper thermal matching to the combustor and the bullet tip and fiber. The diameter of hole 125 preferably ranges from about 200 microns to about 5 millimeters. In a preferred embodiment, bullet tip 128 includes angled surface 134 for helping to guide a fiber 124 into the hole of the bullet tip. Although the bullet tip and tubing are shown as two separate elements, in an alternative embodiment, an integral tip may comprise both elements.

A fiber 124 is inserted and guided through the back bullet tip end until it extends out of the front bullet tip end (in one embodiment to about two millimeters from the front bullet tip end). In one embodiment the fiber comprises a multi-mode quartz fiber that has a fiber connector attached thereto with an epoxy.

A liquid molding compound is then injected through the front bullet tip end. The liquid molding compound may comprise a material which is capable of supporting the fiber in the bullet tip such as an adhesive, for example. The molding compound can be injected with a syringe apparatus so that it fills up at least a portion of the inside of tubing 130. In one embodiment, the compound comprises a high temperature silica-based adhesive which is able to withstand temperatures up to about 1500° C.

A glass or quartz capillary centering sleeve 126 can be slipped over the fiber in the bullet tip prior to the hardening of the liquid molding compound. The diameter of the centering sleeve preferably ranges from about 150 microns (for a smallest inner diameter) to about 4 millimeters (for a largest outer diameter). The lengths of the centering sleeve and bullet tip must be sufficient to center the fiber and generally range from several millimeters to several inches. The tubing length is dependent on the application wherein the fiber will be used.

After the adhesive cures, the front surface and fiber can be polished using a fiber optic polisher. In one embodiment, the front surface is polished until the larger diameter section of the bullet tip front end is about 0.2 micrometers fine.

Because the bullet tip hole 125 has a diameter smaller than the diameter of tubing 130, the bullet tip helps to reduce hot gas leakage in the event of an adhesive failure.

Figure 6:
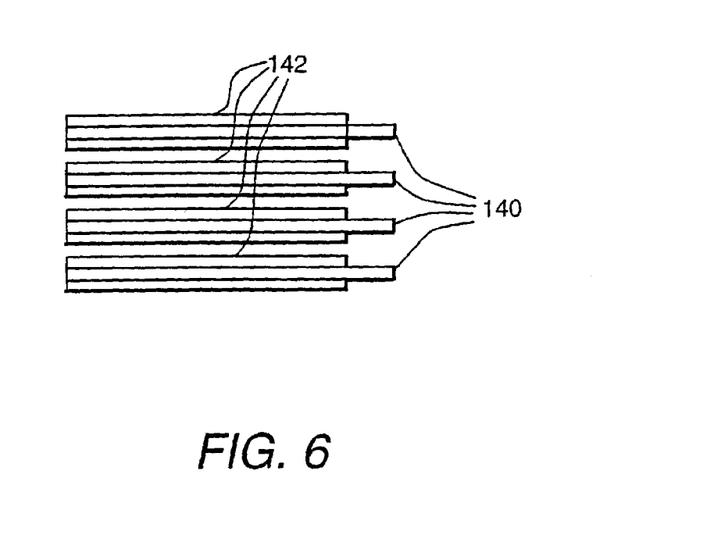
FIG. 6 is a perspective view of a plurality fibers.

FIG. 6 is a perspective view of a plurality fibers 140 coated with fiber coating 142. Any suitable optical fiber material can be used. In one embodiment, germanium or fluorine doped silica fibers are used for the fibers and a plastic such as a polyimide is used for the coating. Preferably the fibers are of substantially equal length and each of the fibers has had the coating removed from a bundle end. The coating can be removed by a technique such as flame-burning, for example. The coating material remains intact beyond the bundle ends.

Figure 7:
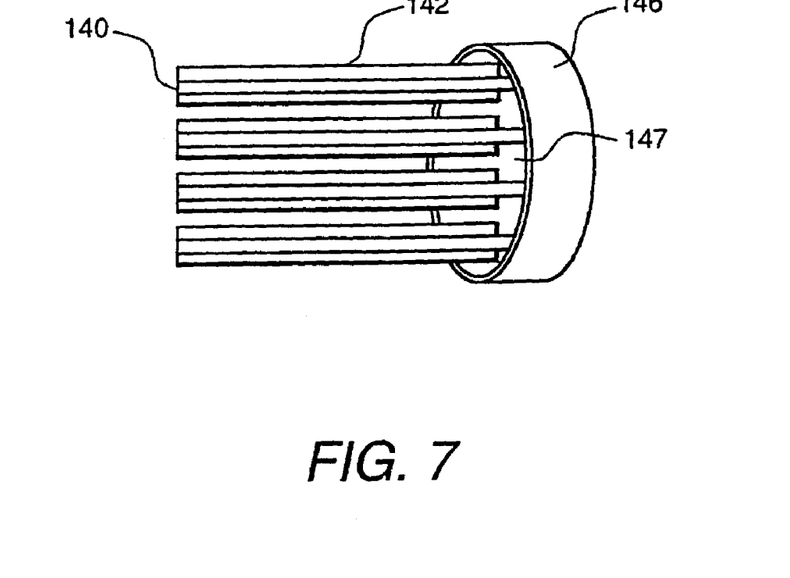
FIG. 7 is a view similar to that of FIG. 6 further showing a ring filled with glass paste.

FIG. 7 is a view similar to that of FIG. 6 further showing a support ring 146 filled with glass paste 147. The bundle ends of the optical fibers are packed into support ring 146. In one embodiment, the support ring comprises an alloy such as Kovar that can withstand high temperatures.

The spaces between the bundle ends of the optical fibers are then filled with a glass paste which may comprise glass frit and or powder, for example. In one embodiment, the glass paste comprises a boric glass paste which is useful because of its relatively low melting temperature.

The glass paste is heated to its melting temperature (about 680° C.) and maintained at the melting temperature until the glass paste fuses and bonds to the bundle ends. The process may occur over several hours. The temperature should not exceed 700° C. for silica optical fibers. After bonding, the temperature of the glass paste is slowly reduced to anneal the glass. Prolonged heating at about 500° C. is expected to be useful for silica optical fibers and boric glass paste to prevent cracking. A slow annealing process occurring over about six to about twelve hours is useful because most glass shrinks more significantly (about $1 \times 10^{-5}$ inch per inch per degree Celsius (i/i/° C.)) than quartz (about $0.5 \times 10^{-6}$ i/i/° C.).

Figure 8:
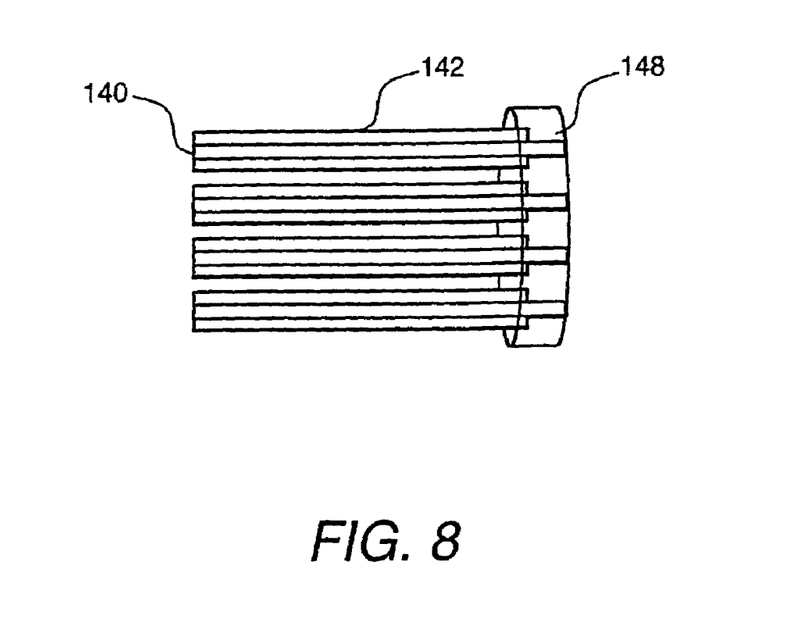
FIG. 8 is a view similar to that of FIG. 7 showing a polished glass and fiber surface.

FIG. 8 is a view similar to that of FIG. 7 showing a polished glass 148 and fiber surface. After annealing, any excess glass is removed and the front surface of the glass paste and fiber bundle ends is polished. The other ends of the optical fibers can be packaged in a conventional bundle cable if they are not going to be subject to the high temperature environment in which the fiber bundle will be used.

Figure 9:
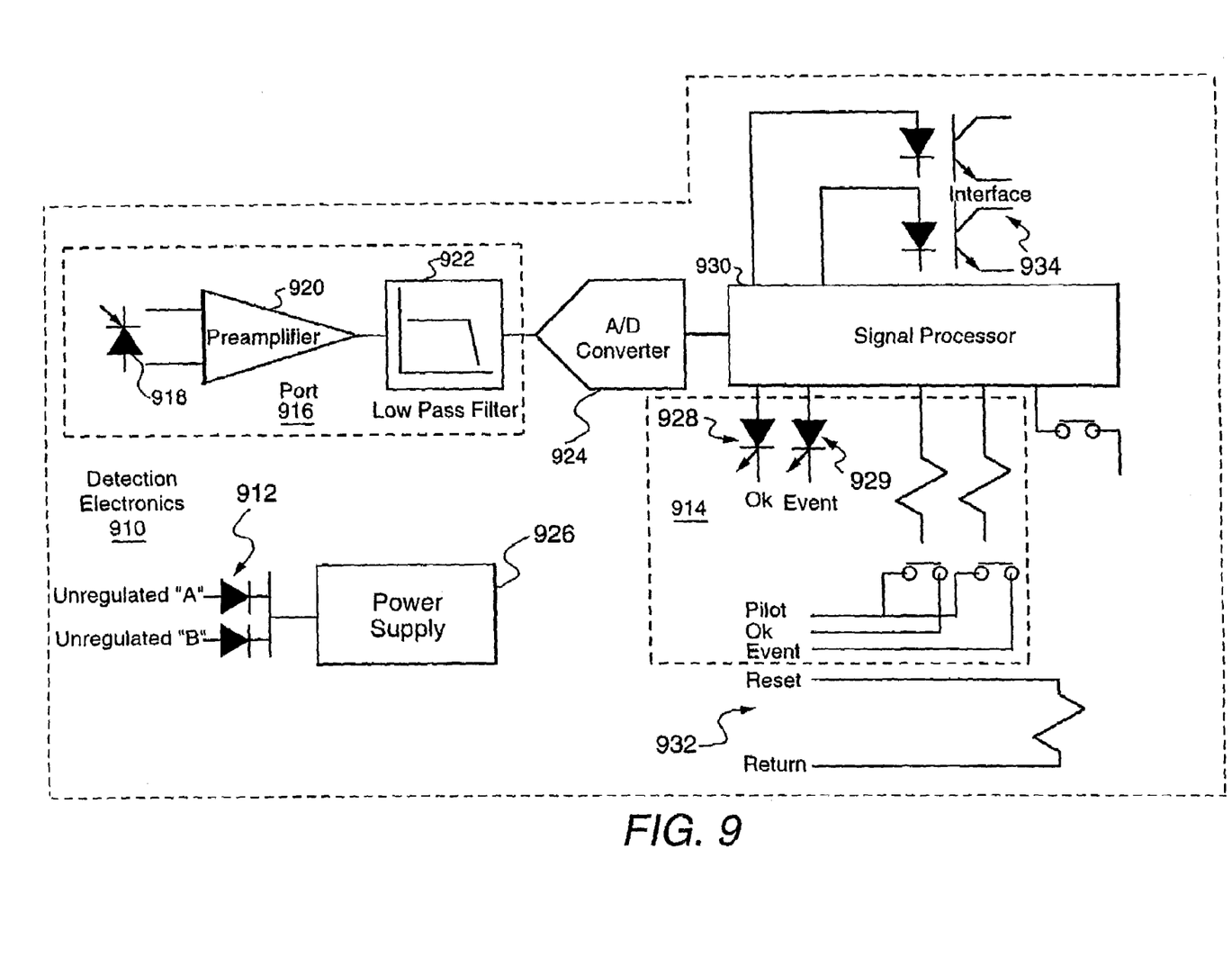
FIG. 9 is a circuit diagram of one detection electronics embodiment of the present invention.

The fiber bundle can be sealed rigidly and hermetically in the support ring to a mating ring at an engine instrument port, for example. It is expected that the mechanical strength of the system can be improved by recoating the fibers with a high temperature polyimide or similar material after bonding the glass paste. FIG. 9 is a circuit diagram of a detection electronics 910 embodiment of the present invention. The detection electronics receives power from an external DC power source or sources 912. A controller 914 can provide a pilot voltage to be used for various contact closure interfaces and a signal line for resetting the electronics. The controller can sense contact closures which communicate the operability of the detection electronics, and the controller can sense the detection of a flashback event.

An input port 916 preferably includes a photodetector 918, a preamplifier 920, and a low pass filter 922. The preamplifier is useful for converting the photodetector output signal to an output signal compatible with an input range of an analog to digital (A/D) converter 924. The low pass filter can be used for anti-aliasing. Although one input port 916 is shown in FIG. 9, in one embodiment, a plurality of input ports are multiplexed within the A/D converter or by a separate multiplexer (not shown in FIG. 9).

The A/D converter can operate at a sample rate that is higher than a Nyquist rate defined by the bandwidth of the photodetector and thus permit a simpler anti-aliasing filter implementation and reduces the effects of random noise on the conversion data stream. In one embodiment the photodetector comprises a photodiode with a bandwidth of about 10 kilohertz.

A power supply 926 converts raw bus quality power from sources 912 to the required regulated voltages. If one of the sources fails, a diode connection permits the detection electronics to continue operation.

In one embodiment, a plurality of controllers 914 are present with each controller corresponding to a respective input port 916. Controller 914 includes two local indicators to show the state of the detection electronics. An OK indicator 928 is used to indicate that the detection electronics are fully operational and that the photodetectors are providing acceptable data based on DC level and AC characteristics. An event indicator 929 indicates that a signal processor 930 has determined that a flashback event has occurred. In one embodiment, signal processor 930 comprises a digital signal microprocessor. A contact 932 can be used to permit the signal processor to reset the detection electronics. An I²C interface 934, for example, can be used to provide data such as raw A/D converter data, internal state data, and history/log data to an external monitoring device (not shown in FIG. 9).

Figure 10:
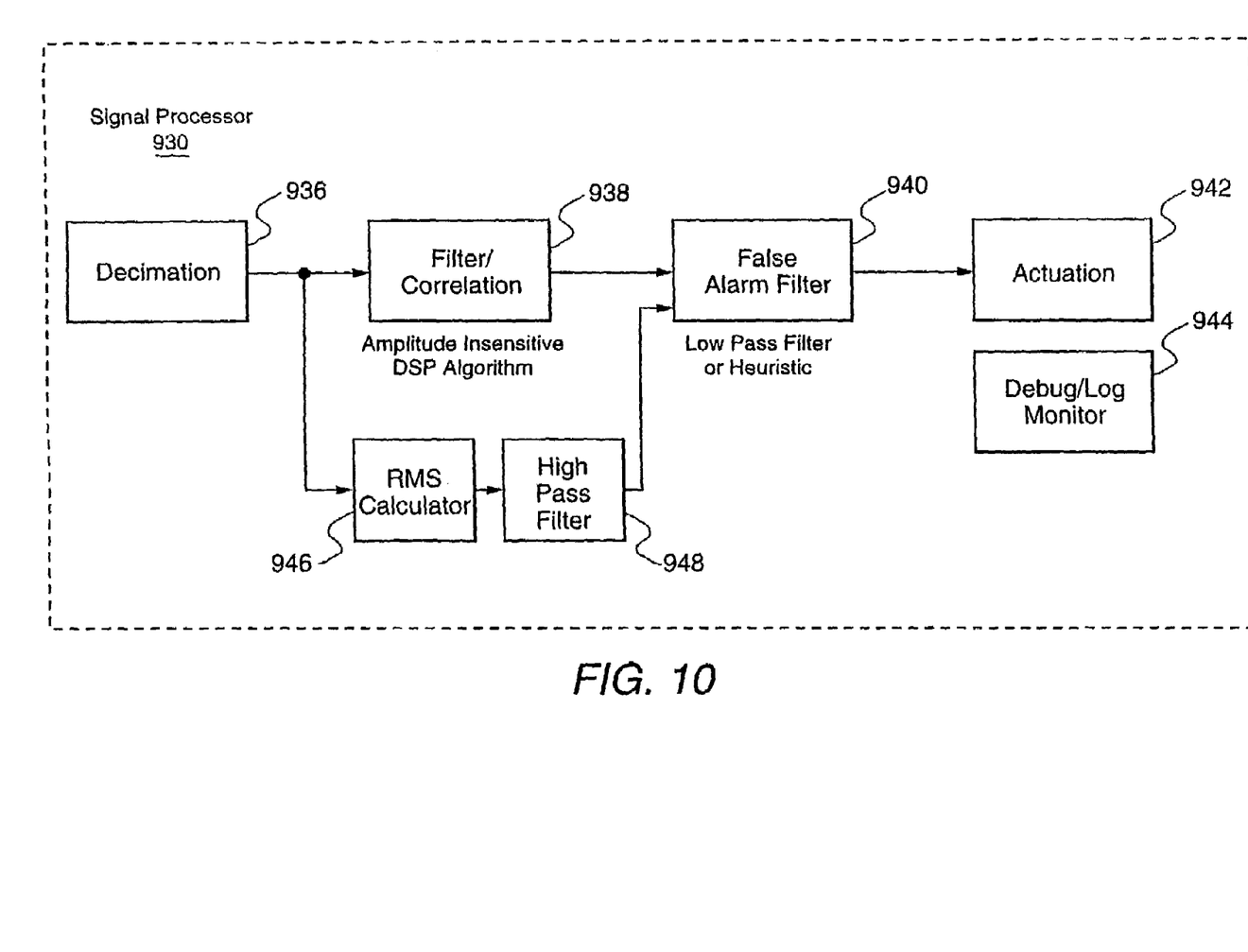
FIG. 10 is a block diagram of a signal processor for use in the embodiment of FIG. 9.

FIG. 10 is a block diagram of a signal processor 930 for use in the embodiment of FIG. 9 for processing the digital data from A/D converter 924 to determine the presence of a flashback.

A decimation element 936 can be implemented in an interrupt service routine while filling a sample data buffer with data to be processed by background tasks. Decimation can be accomplished by integrating the data input signals for the appropriate number of samples, placing that sum into the sample data buffer, and resetting the integration to zero.

A filter/correlation element 938 performs a correlation computation of the sample data buffer with a fixed step response. The correlation computation is performed each time a decimated sample has been added to the sample buffer. The ability to perform the computation in an amplitude insensitive manner allows the signal processor to adapt to various systematic and time dependent variations and to eliminate any unwanted 60 hertz or other extraneous pickup noise.

A false alarm filter 940 may comprise a low pass filter or a Heuristic algorithm, for example, which is applied to the correlation results. In one embodiment, the filter/correlation element and the false alarm filter are preferably designed to provide a flashback indication within 0.5 seconds of a flashback event's inception.

In an optional, preferred embodiment, decimation element 936 additionally provides information in the sample data buffer to an RMS calculator 946 which in turn supplies a normalized output signal to a high pass filter 948. After filtering the output signal from the RMS calculator, the high pass filter supplies a filtered output signal to false alarm filter 940 which reviews both the filtered and correlated data from filter/correlation element 938 (which provides a median value) and the filtered, RMS calculated data (which provides a threshold by requiring a predetermined number of spikes prior to designating an alarm) from high pass filter 948.

The signal processor can "learn" the non-flashback conditions of each sensor under normal combustion and record its operations. If desired, flashback can be deliberately induced so that the change in correlated and normalized components can be recorded and evaluated.

An actuation element 942 can be used to control the state of the event indicators 928 and 930 and contact 932. A debug/log monitor 944 can provide real time through interface 934.

Thus, the detection electronics including the signal processor permit adaptive signal processing (tailored to the detection sensitivity to the particular mode of operation) for multiple flashback sensor inputs simultaneously while eliminating erroneous pickup data and ensuring the correct detection based on bothcorrelated and normalized shifts of various levels. Therefore, there is no need to tailor an algorithm for each individual sensor.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for packaging a bundle of optical fibers for high temperature sensing applications comprising the steps of:

providing a plurality of coated optical fibers having exposed cores at bundle ends;

packing the bundle ends of the optical fibers in a support ring;

filling the spaces between the packed bundle ends of the optical fibers with a glass paste;

heating the glass paste to a melting temperature until the glass paste fuses and bonds to the bundle ends; and slowly reducing the temperature of the glass paste.

2. The method of claim 1 wherein the step of providing optical fibers comprises providing doped silica fibers.

3. The method of claim 2 wherein the step of filling the spaces between the bundle ends of the optical fibers with a glass paste comprises filling the spaces with boric glass paste.

4. The method of claim 1 further including sealing the support ring to a mating ring in a combustion region.

5. The method of claim 3 wherein the step of heating the glass paste comprises heating the glass paste to a temperature less than or equal to 700° C.

6. The method of claim 2 further including polishing the glass paste and fiber bundle ends after slowly reducing the temperature.

7. The method of claim 6 further including recoating the fibers with a high temperature polyimide after slowly reducing the temperature.

8. A bundle of optical fibers for high temperature sensing applications comprising:

a plurality of optical fibers comprising silica; and glass paste fused to the optical fibers; and a support ring surrounding the glass paste.

9. The bundle of claim 8 wherein the optical fibers comprise doped silica fibers.

10. The bundle of claim 9 wherein the glass paste comprises boric glass paste.

11. The bundle of claim 8 wherein the support ring comprises Kovar.

* * * * *